Figure 1:
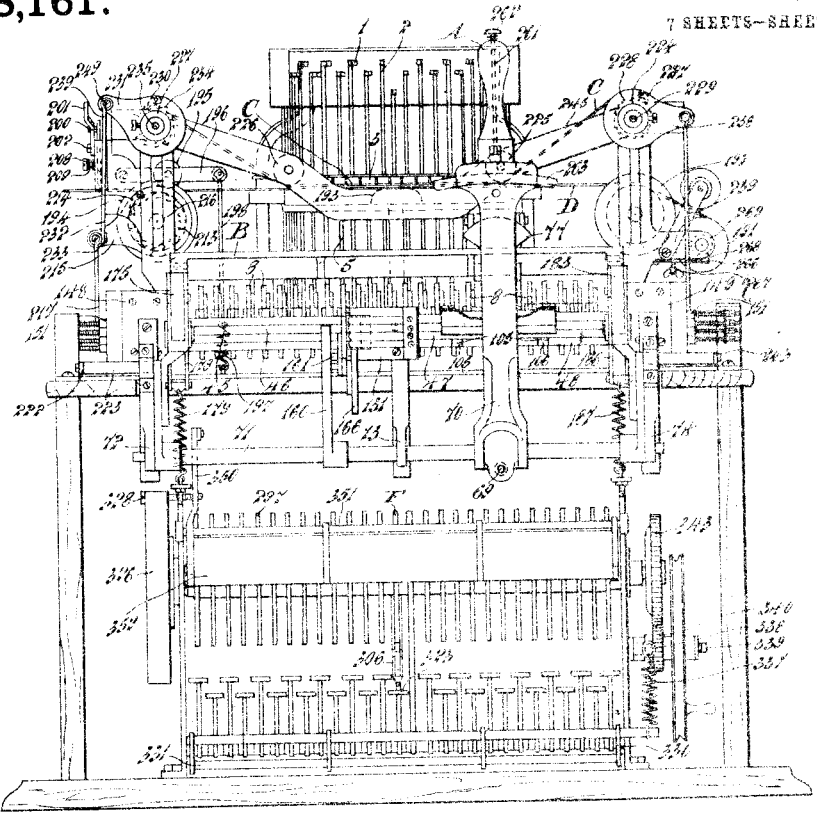

T. MELVILLE.
DOT AND DASH CODE RECORDER.
APPLICATION FILED JULY 1, 1911.

1,088,161.

Patented Feb. 24, 1914.
7 SHEETS—SHEET 1.

Witnesses:
Fred'k M. Curtice
Joseph F. Sullivan

Inventor:
Thomas Melville
By G. Croydon Marks
Attorney

T. MELVILLE.
DOT AND DASH CODE RECORDER.
APPLICATION FILED JULY 1, 1911.
1,088,161.
Patented Feb. 24, 1914.
7 SHEETS—SHEET 2.
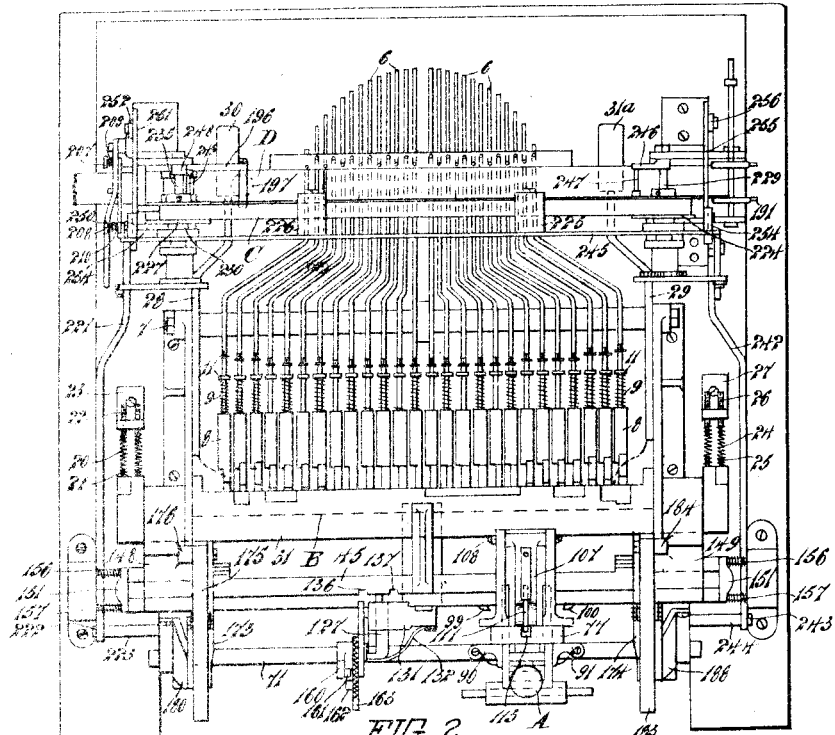
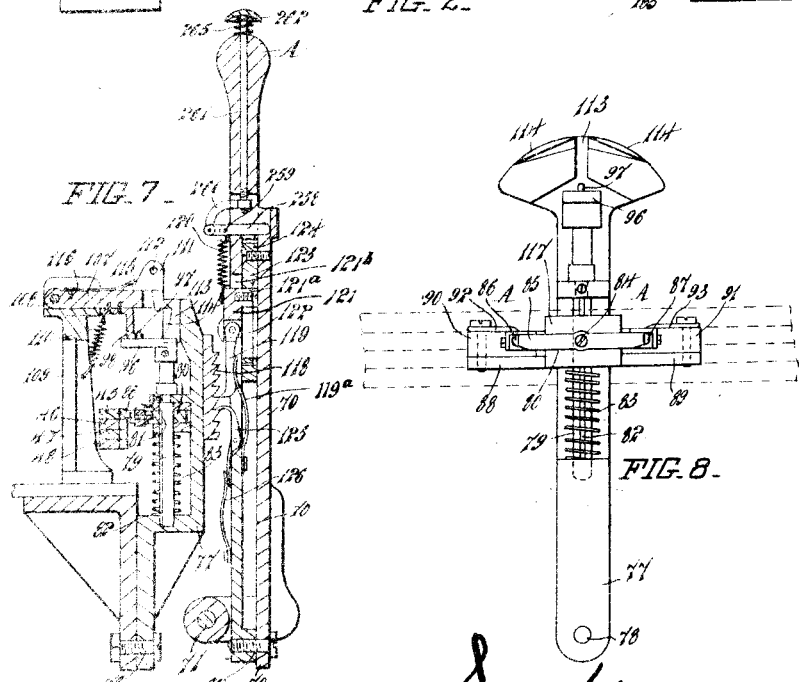

T. MELVILLE.
DOT AND DASH CODE RECORDER.
APPLICATION FILED JULY 1, 1911.

1,088,161.

Patented Feb. 24, 1914.
7 SHEETS—SHEET 3.

Witnesses:
Fred R. Curtice
Joseph V. Sullivan

Inventor:
Thomas Melville
by G. Croydon Marks
Attorney

T. MELVILLE.
DOT AND DASH CODE RECORDER.
APPLICATION FILED JULY 1, 1911.

1,088,161. Patented Feb. 24, 1914.
7 SHEETS—SHEET 4.

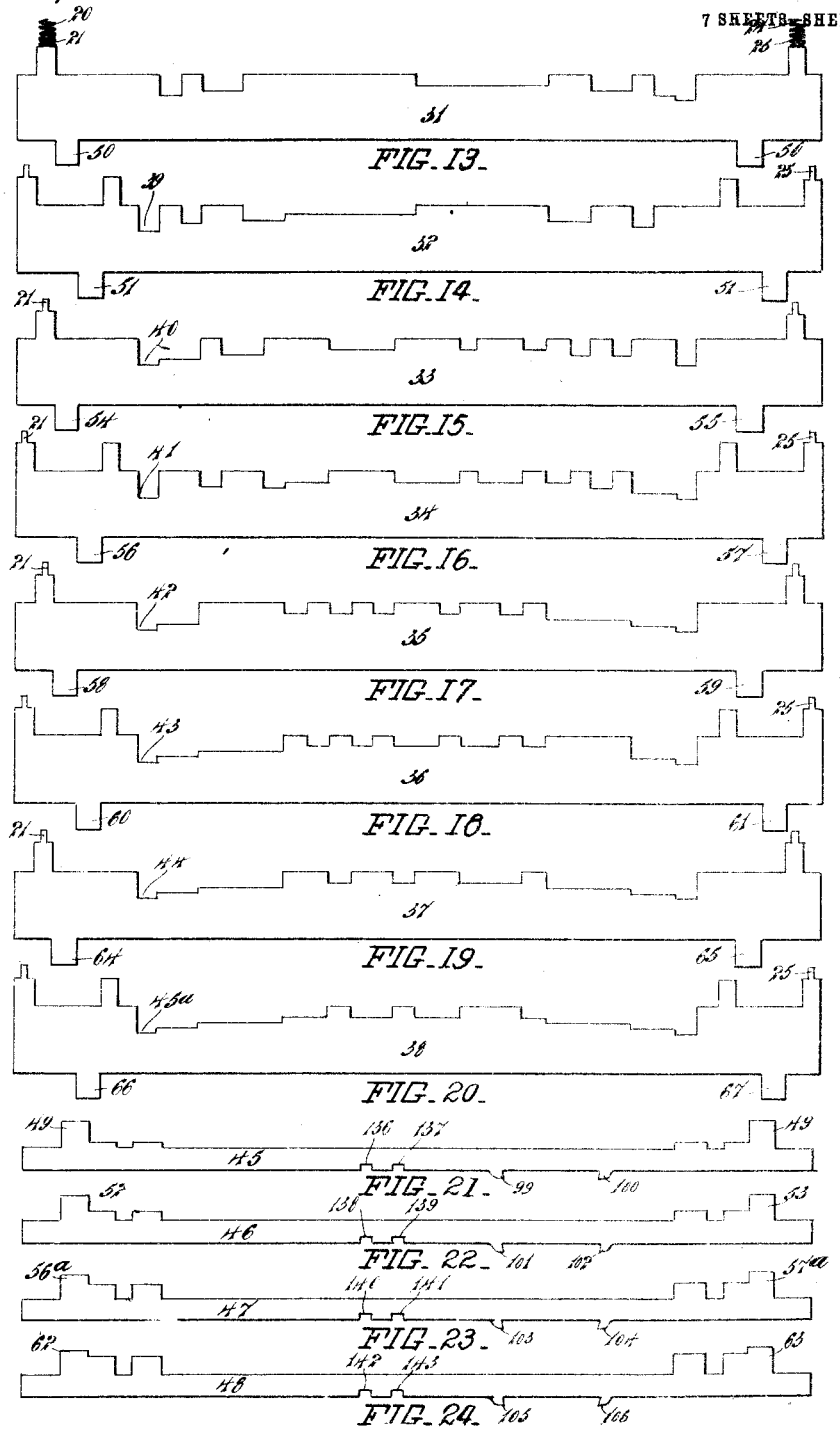

T. MELVILLE.
DOT AND DASH CODE RECORDER.
APPLICATION FILED JULY 1, 1911.
1,088,161.
Patented Feb. 24, 1914.
7 SHEETS—SHEET 6.
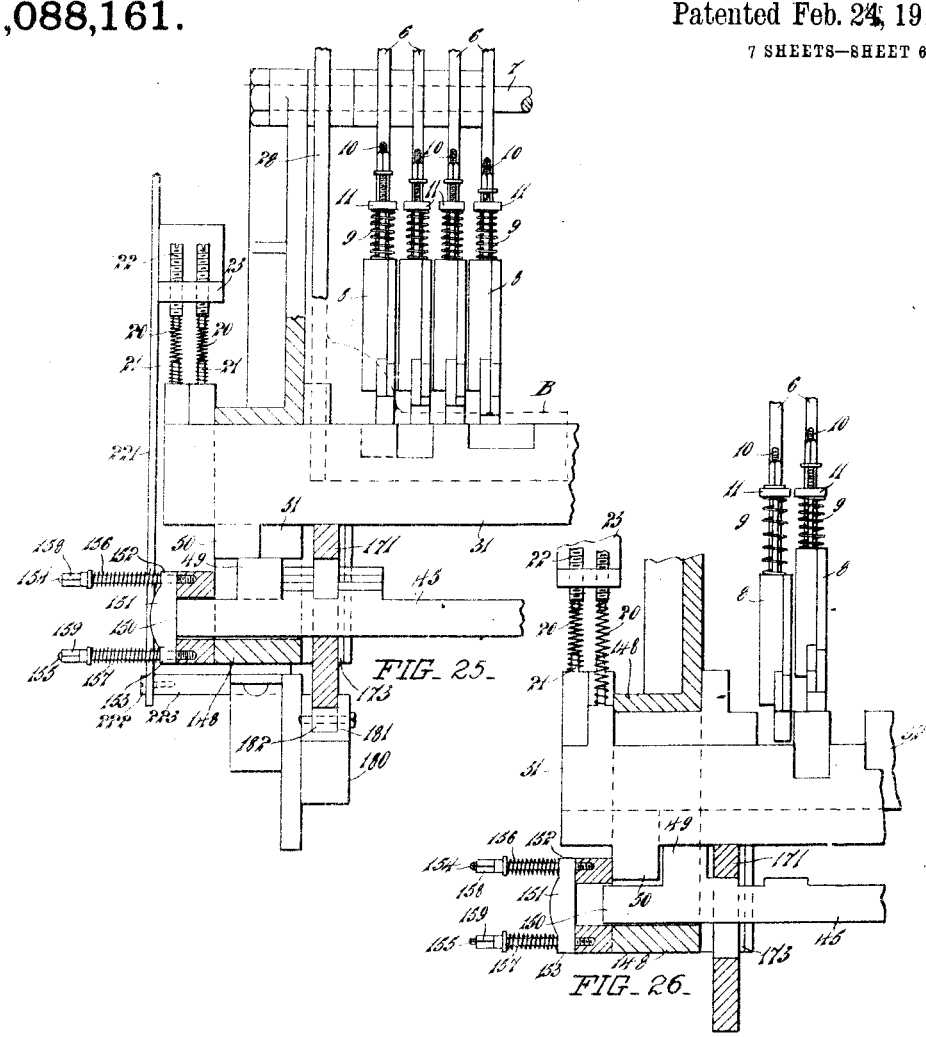
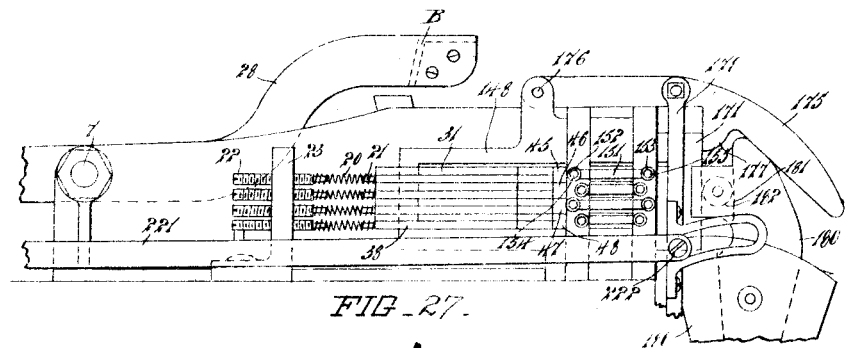

T. MELVILLE.
DOT AND DASH CODE RECORDER.
APPLICATION FILED JULY 1, 1911.
1,088,161.
Patented Feb. 24, 1914.
7 SHEETS—SHEET 7.
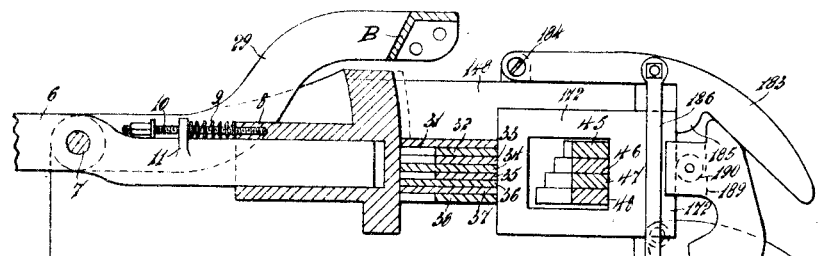
FIG. 28.
FIG. 29.
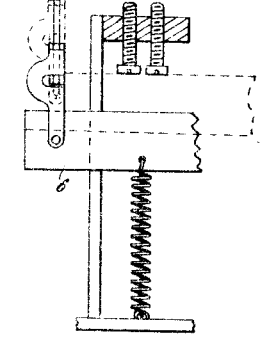
Witnesses:—
Fred R. Curtice
Joseph F. Sullivan
Inventor:—
Thomas Melville
by Braydon Marks
Attorney

UNITED STATES PATENT OFFICE.

THOMAS MELVILLE, OF DUNEDIN, NEW ZEALAND

DOT-AND-DASH-CODE RECORDER.

1,088,161.  Specification of Letters Patent.  Patented Feb. 24, 1914.

Application filed July 1, 1911. Serial No. 636,432.

*To all whom it may concern:*

Be it known that I, THOMAS MELVILLE, a citizen of the Dominion of New Zealand, and residing at 40 George street, Dunedin, in the Provincial District of Otago, in the Dominion of New Zealand, have invented certain new and useful Improvements in Dot-and-Dash-Code Recorders, of which the following is a specification.

The invention relates to an apparatus for recording flash light signals transmitted by what is known as the "Morse" or "dot and dash" system.

By the use of my invention signals may be received by those who are not acquainted with the "dot and dash" code system, and the message received is written in ordinary type.

The letters of a message received are recorded by means of metal type which prints the letters of the alphabet in the manner of a typewriter by means of a carbon ribbon superposed upon a ribbon of paper. The particular letter printed depends upon the positions relatively to each other of a series of slide bars which provide that only one letter may be printed at a time by the action of a depression bar. Said bar extends across the machine, and when depressed by the operator engages with the end of one in the series of levers which actuate the type bars. The slide bars are actuated by the operator who moves a hand lever to the right or left according to whether the station from which the signal is being received is transmitting a dot or a dash. The lever is vibrated a number of times according to the number of dots and dashes representing the letter of the signal, and then the depression bar is struck by the operator, the corresponding type being thereby actuated and the letter printed upon the paper ribbon referred to.

I will now describe my invention in detail by the aid of the drawings, wherein;—

Figure 5:
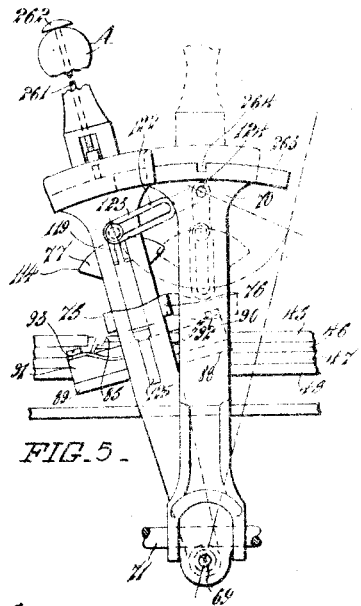
Figure 6:
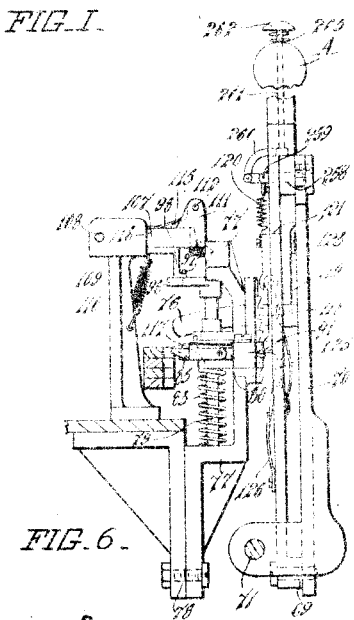
Figure 3:
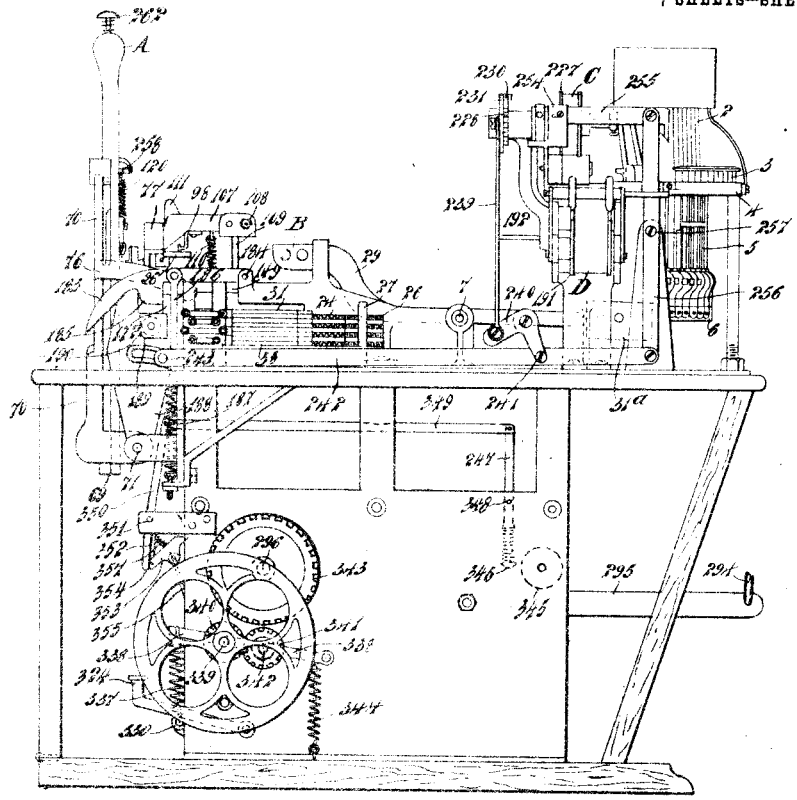
Figure 9:
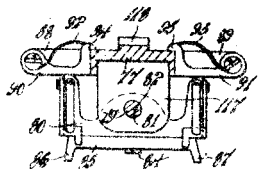
Figure 11:
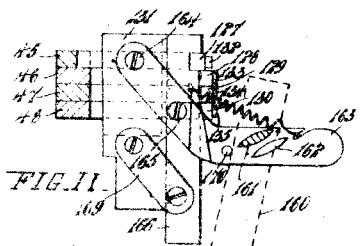
Figure 10:
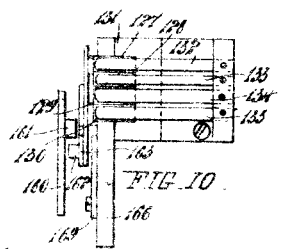
Figure 12:
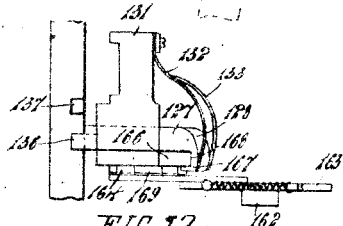
Figure 4:
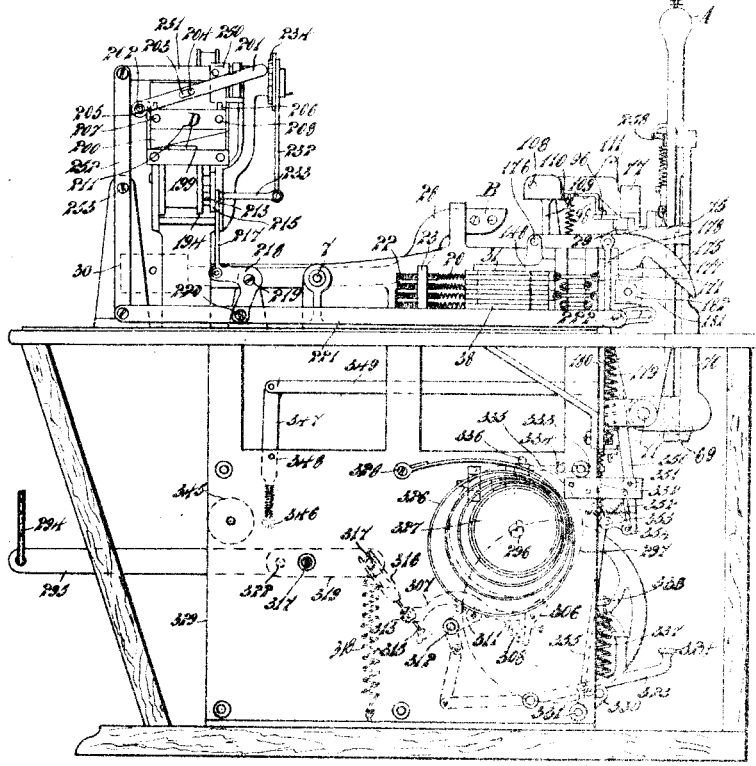

Figure 1 is a front elevation of my improved apparatus; Fig. 2 is a plan with some of the parts removed; Fig. 3 is a side elevation looking toward the right hand side of the machine; Fig. 4 is a side elevation looking toward the left hand side of the machine; Fig. 5 is a front elevation, and Fig. 6 is a side elevation of the operating lever and parts actuated thereby; Fig. 7 is a side sectional elevation of the parts shown in Figs. 5 and 6; Fig. 8 is a rear elevation of part of the mechanism shown in Fig. 7; Fig. 9 is a sectional plan view taken on the line A—A of Fig. 8; Figs. 10 and 11 are respectively front and side elevations of part of the apparatus shown in Figs. 1 and 2; Fig. 12 is a plan view of the parts shown in Fig. 11; Figs. 13 to 20 inclusive are plan views of a series of releasing or stop plates; Figs. 21 to 24 inclusive are plan views of a series of slide bars for controlling said releasing or stop plates; Fig. 25 is a part sectional plan on an enlarged scale showing one of the releasing plates and one of the sliding bars with the adjacent parts; Fig. 26 is a similar view showing a plate in its releasing position; Fig. 27 is an end elevation of the parts shown in Fig. 25; Fig. 28 is a sectional elevation looking in the same direction as in Fig. 27, and Fig. 29 is a sectional elevation of a type lever.

Before describing the details of the drawings I will indicate broadly what the mechanism is intended to do. The operator stands in front of the machine and grasps lever A. For every time a flash signal is transmitted from the sending station he moves the lever for a "dot" flash to the right, and for a "dash" flash to the left. When the number of dots and dashes constituting the code signal of a letter have been received, he pulls the lever toward him, and then depresses the depression bar B, which in Fig. 2 is shown in dotted lines. This has the effect of causing the type letter corresponding to the signal sent to strike upon the carbon ribbon C and to print the letter upon the paper ribbon D.

Referring now to details: The various type letters 1 for printing the letters of the alphabet are fixed upon bell crank levers 2 (see Figs. 1, 3 and 29) each journaled in an independent jaw 3 fixed upon the quadrant bracket 4. The short arm of the bell crank lever is connected by a vertical rod 5 with a horizontal lever 6 journaled upon a bar 7 (Fig. 2) extending across the machine. Upon the end of the lever slides a striking head 8 (see Figs. 25, 26 and 28) which is pushed toward the end of the lever by a spiral spring 9 upon a pin 10, projecting from the end of the striking head, the spring being interposed between the striking head and bracket 11. upon the lever. The type levers are similarly constructed and have the same operating parts, it is therefore necessary to describe only one set, the same indicating numerals being used to indicate corresponding parts upon the other sets. Eight superposed stop plates 31, 32, 33, 34, 35, 36, 37, and 38, shown in detailed plan in Figs. 13 to 20 inclusive, extend across the machine with their rear edges in contact with the striking heads 8, as shown in Figs. 25, 26 and 28. Each of the stop plates is acted upon by two springs, one at each end, which normally tends to push them away from the striking heads. The compression spring 20 engages over a snib 21 projecting from the plate, and at the other end over the end of an adjusting screw 22 which passes through the bracket 23. Upon the other end of the plate a similar compression spring 24, Figs. 2 and 3 engages over the snib 25 at one end, and at the other end over the adjusting screw 26 which passes through a bracket 27. The depression bar B is fixed at each end upon the levers 28 and 29 which are pivoted on the cross bar 7 and are respectively counterbalanced by the weights 30 and 31ª, Figs. 2, 3 and 4.

To print a letter upon the paper ribbon D it is necessary that the lever 6 operating the type bar shall be depressed at its outer end. This depression is effected by the depression bar B which contacts with the particular striking head which may be projected into its path. The stop plates normally prevent any of the striking heads from being projected. To provide for the projection of each of the striking heads independently of the others, the stop plates have a series of recesses which may be brought into superposed correspondence by a number of different arrangements of the plates relatively to each other, the movement of one or more of the stop plates being necessary to permit a striking head to pass sufficiently far into the superposed series of recesses in the several stop plates to come into the path of the depression bar.

The stop plates are independently shown in Figs. 13 to 20. Fig. 13 showing the uppermost plate 31, and the following figures the plates 32, 33, 34, 35, 36, 37, and 38 beneath it, arranged in regular order. It will be seen that the plate 32 Fig. 14 has a plurality of recesses including the recess 39 and the succeeding plates have recesses 40, 41, 42, 43, 44, and 45ª, similar to the recess 39 and correspondingly located on each plate. The plate 31 Fig. 13, has however no recess in that portion of its edge, and consequently must be moved backwardly to enable the striking head to be projected to the bottom of the corresponding recesses of all the other plates. By tracing out the recesses in the several plates relatively to each other, it will be found that only one striking head can at one time be projected sufficiently far into the recesses to be in the path of the depression bar B and at least one, and sometimes two, three, or four of the plates must be withdrawn before any striking head can be projected. The stop plates are normally prevented from moving back, and, when they are permitted to move back are limited in their travel by slide bars which are independently shown in the Figs. 21 to 24 inclusive, and to a larger scale in Figs. 25 and 26. There are four of these slide bars 45, 46, 47, and 48, superposed (see Fig. 28) and parallel with the stop plates, each bar acting in conjunction with and being of a thickness of two of the stop plates.

The slide bar 45, Fig. 21, which works in connection with the stop plates 31 and 32, Figs. 13 and 14, has the projection 49 at one end equal in width to corresponding projections 50 and 51 (see also Figs. 25 and 26) projecting respectively from the stop plates 31 and 32—the projections being relatively located so that, with the parts in normal position, projection 49 bears one half on projection 50 and the other half on projection 51, (Fig. 25) and movement of the slide bar to the right or left for a space equal to half the width of the projection leaves the road clear for one of the plates to move back, Fig. 26. Exactly similar projections, arranged in the same way, are upon the opposite ends of the bars and plates, and are indicated by the same numerals. In the same way the slide bar 46 has projections 52 and 53 which respectively engage projections 54 and 55 of the stop plate 33 and projections 56 and 57 of the stop plate 34. The slide bar 47 has projections 56ª and 57ª which engage projections 58 and 59 of the stop plate 35 and projections 60 and 61 of the stop plate 36 and the slide bar 48 has projections 62 and 63 which engage projections 64 and 65 of the stop plate 37 and projections 66 and 67 of the stop plate 38.

I will now describe how the slide bars are moved laterally to release the stop plates. Referring particularly to Figs. 1, 2 and 5–9, the hand lever A is pivoted at 69 upon an arm 70, which is secured to a rocking spindle 71, supported in bearings 72, 73 and 74, Fig. 2. The arm 70 remains stationary when the lever A is moved about the pivot 69, but moves with said lever when the latter is moved in a forward direction, thereby rocking the shaft 71. The lever A has guide arms 75, 76, Fig. 6, extending rearwardly therefrom, one on each side of a lever 77, pivoted at 78 to a suitable part of the framework, the lever 77 thus being moved with the lever A when said lever is moved about the pivot 69, but remaining stationary when the lever is moved in a forward direction. A vertical rocking spindle 79 is carried by the lever 77, being supported near its upper end in a lug extending from the lever and resting at its lower end in a recess therein. A slide block 117, having rack teeth 118, is slidably mounted upon the lever 77, and has apertures through which the spindle 79 passes, the rear portion of the block being of bifurcated or forked formation, and holding between said bifurcated portions a crosshead 80, which is thereby slidable on the spindle 79, but is caused to rotate or rock therewith by means of a feather 81, sliding in a key way 82 in the spindle. The slide block and crosshead are normally held in their uppermost position as shown in Fig. 7, by means of a spring 83, surrounding the spindle 79.

The crosshead 80 has pivoted thereto at 84, a rocking arm 85, at the ends of which are formed the projections or detents 86 and 87, adapted to engage with lugs projecting from the slide bars 45—48. The slide bar 45 has the lugs 99 and 100, the bar 46 has the lugs 101 and 102, the bar 47 has the lugs 103 and 104, and the bar 48 has the lugs 105 and 106, see Figs. 21-24 inclusive. When the bars 45—48 are in their normal position, the lugs are supported in two series, as will be readily seen. The crosshead 80, and thereby the rocking arm 85, is normally retained in such a position that the detents 86 and 87 are out of engagement with the lugs of any of the slide bars, but the crosshead is adapted to be rocked in one direction or the other, about the axis of spindle 79, according to the direction of movement of the lever A, so as to throw one or other of the detents into engaging position with one of the lugs of one of the slide bars. This movement of the crosshead is effected by means of a lever or crank 96 secured to the upper end of the spindle 79, to which the crosshead is secured, said crank having a pin 97 normally resting in a fork 98, which is secured to an arm 107 pivoted at 108 upon a standard 109. The arm 107 is held down by a tension spring 110. It will be seen that when the lever A is moved about pivot 69, the coaction of the fork 98 and the pin 97 causes the spindle 79 and thereby the crosshead 80, to rock, so that one of the detents 86 or 87 engages with one of the lugs on one of the slide bars. The crosshead, and thereby the spindle 97, is returned to, and held in its normal position, by means of stop arms 90 and 91 pivoted upon brackets 88 and 89 projecting from the slide block 117, said stop arms pressing against the ends of the crosshead, under the action of springs 92 and 93, and normally holding the same in the position shown in Fig. 9. The stop arms have hooked ends 94 and 95, respectively, which limit their inward movement.

The movement of the levers A and 77 causes the pin 97 to leave the fork 98, and in order to enable the pin to again enter the fork when the levers are returned to normal position, the arm 107 is adapted to be raised on the return movement, by the engagement of the cam surface 114 on the upper end of the lever 77, with a pawl 111 pivoted to the arm at 112. The arm 107 is normally held down, as shown in Fig. 8, owing to the engagement of the pawl 111 with a notch 113 in the lever, but to allow movement of the lever, the pawl is rocked on its pivot, by engagement with the rear face of the cam 114, against the action of spring 116 on the tail piece 115 of the pawl, and at the end of the movement of the lever, the pawl is moved by its spring into engagement with the upper surface of cam 114, to effect the raising of the arm 107.

The rocking arm 85 is normally opposite to the upper slide bar 45, and this bar is operated first according to the first flash received, either "dot" or "dash". If the signaled letter requires it, the bars 46, 47 and 48 are then operated in succession, and in order to move the crosshead along the spindle 79, to cause the rocking arm 85 to successively engage the bars, the pawl 119, slidably mounted on the lever A, is adapted to engage the rack teeth 118 of the slide block 117. The pawl 119 is pivotally mounted in a block 121 which works in a slot 121ᵇ in the lever A, the block 121 having a pin or projection 121ᵃ which projects into a slot 122 in an arm 123 which is pivoted at its upper end 124 to the arm 70. A spring 120 tends to move the block 121 to the upper end of the slot 121ᵇ. It will be seen from Fig. 7 and from the dotted lines in Fig. 5 that when the lever A is in its normal or central position, the block 121 and the pawl 119 are held in their lowermost positions, due to the engagement of the pin 121ᵃ with the upper end of the slot 122 in the arm 123, the arm being in a vertical position as shown in Fig. 5, and holding the block and pawl down against the action of the spring 120. When the lever A is moved about its pivot 69, the block 121 and the pin 121ᵃ are moved therewith and consequently, as the arm 123 is pivotally secured to the relatively stationary arm 70, the pin exerts a camming action on the side of the slot 122, with the result that the arm 123 is moved from its vertical position to an inclined position, as shown in full lines in Fig. 5. When the arm 123 is in this inclined position it cannot exert a downward pressure on the block 121 and consequently this block is moved upward in the slot 121ᵇ under the action of the spring 120, and the pawl 119 is therefore moved upwardly a space equal to that of one of the rack teeth 118, the pawl being pressed into engagement with these teeth by means of a suitable spring 119ᵃ. As the lever A is returned to its normal or central position, the pin 121ᵃ will exert a camming action on the opposite side of the slot 122, which will result in the movement of the arm 123 to its vertical position, as shown in dotted lines in Fig. 5, and as the arm is moved to this position, the pin 121ª, by contact with the upper end of the slot, will be depressed to the position shown in dotted lines in Fig. 5 and in full lines in Fig. 7, with the result that the pawl 119 will be moved downwardly and will carry with it the slide block 117 and the parts carried thereby. On the return of the lever A, to normal position, the pawl is again moved downward by the arm 123 to its lower position and carries with it, by engagement with teeth 119, the slide block 117 and parts carried thereby. The pawl 125 acted on by spring 126 holds the block 117 in its various positions. When the lever A is moved forwardly, after the signals for a letter have been received, the pawls 119 and 125 are disengaged and the slide block and connected parts are returned to normal position by the spring 83. When a slide bar has been moved by one or other of the detents 86 and 87 of the rocking arm 85 to the end of its travel, it is retained by a spring operated bolt which passes into a notch in the bar.

There are four bolts 127, 128, 129, 130 (see Figs. 2, 10, 11 and 12) slidable in a guide bracket 131 and operated upon respectively by the flat springs 132, 133, 134 and 135, the bar 45 having the notches 136 and 137, one or other of which receives the bolt 127 according to the direction in which the bar is moved. The bar 46 has similar notches 138 and 139 for the bolt 128, the bar 47 has notches 140 and 141 for the bolt 129, and the bar 48 has notches 142 and 143 for the bolt 130. The disengagement of the various bolts 127—130 from the notches of the slide bars, is effected by the rocking movement of the spindle 71, due to the forward movement of the lever A and arm 70, the spindle having fixed thereto an arm 160 (see Figs. 1 and 11), which has a projection 161, adapted upon the return of the arm to engage beneath a curved cam 162 projecting from a lever 163, pivoted at 164 upon the guide bracket 131. The lever 163 is pivotally connected by a pin 165 with a rising bar 166 in engagement with the ends of the bolts, each bolt having a lateral projection 167 (see Fig. 12) in which is a recess 168 for receiving the rising bar 166, the recesses of the four bolts being superposed in normal position and forming a guide for the bar. It will be seen that as the bar is raised and moved forward by the lever 163, the bolts will all be withdrawn and the slide bars returned to normal position. Parallel movement of the rising bar is obtained by a link 169 pivoted upon the guide bracket at one end and upon the rising bar at the other. To allow projection 161 to clear the cam on its forward movement, the lever 163 is in two parts pivotally connected at 170. The slide bars, which are guided in brackets 148 and 149, return to their normal position under the influence of springs at each end. As all the slide bars are similarly furnished at both ends it will only be necessary to describe the arrangement of one end of the uppermost bar. A projection 150 (see Figs. 25, 26 and 27) from the end of the bar 45 engages a crosshead 151 having eyes 152 and 153 and sliding upon the pins 154 and 155 projecting from the bracket, these pins having upon them spiral compression springs 156 and 157 respectively. The pressure of the springs on the crosshead is regulated by adjusting nuts 158 and 159 screwing upon the ends of the pins 154 and 155. The end of all the bars are flush with the sides of the guide brackets.

The stop plates are normally prevented from movement by means of rectangular slide blocks 171 and 172 which are located at the ends of the series of plates, and are adapted to slide in guides 173 at right angles to the plates, each block having an opening sufficiently large to clear the slide bars, which pass through them. A lever 175 pivoted at one end in the frame of the machine at 176, has an integral stop 177, which bears against the end of the slide block 171, and prevents movement thereof, and of the stop plates, the lever being drawn downwardly by a bridle 178 pivoted upon it and connected to the tension spring 179. Upon the rocking spindle 71 is secured an arm 180 (see Figs. 4, 25 and 27,) which has a recess 181 at its upper end to receive the slide block 171, and in which recess is a friction roller 182 bearing against the end of the slide block.

It will be seen that when the handle A is moved forwardly the upper end of the arm 180 contacts with the lever 175, which is bent downwardly for the purpose, and raises it so that the stop 177 clears the slide block, which then moves outwardly under the pressure of the springs operating such of the stop plates as are permitted to move rearwardly on account of their respective slide bars having been operated. Upon the other side of the machine is a precisely similar arrangement comprising the lever 183 (see Fig. 28) pivoted at 184, having the stop 185 and operated upon by the bridle 186 drawn down by the tension spring 187. The arm 188 upon the rocking spindle 71 has the recess 189 in which is a friction roller 190 adapted to bear against the end of the slide block 172. The stop plates are returned to their normal position, on the return movement of the lever A, by means of the arms 180 and 188 engaging and moving the slide blocks 171 and 172.

When the lever A is returned to its normal position relatively to the arm 70, it is retained by a bolt 258 fulcrumed at 259 in the lever A and pivotally connected by an arm 260 to the end of the plunger rod 261, which slides longitudinally through the handle and has a knob 262 at its upper end adapted to be pressed by the thumb of the operator when his hand grasps the lever. The bolt 258 slides upon the top of a curved race 263 at the top of the arm 70 until it coincides with and falls into a recess 264 therein. A compression spring 265 is interposed between the knob and the top of the lever A. The paper ribbon D, upon which the message is to be recorded, is wound upon a spool 191, is carried over a flanged guide sheave 192, and across the top of the machine above an anvil pad 193 located where the different units of the type will strike when operated. At the opposite end of the machine the paper passes between the flanges of a guide sheave 194, and is pressed upon by a friction roller 195, which fits between said flanges and is journaled in a loop 196 pivoted at one end, and, at the other drawn down by a tension spring 197 connected to a bridle 198. The paper then passes between the cutting off guillotine, comprising a fixed blade 199 and a vertically sliding blade 200 operated by a hand lever 201 pivoted at 202, and having a longitudinal slot 203 which receives a pin 204 projecting from the blade. The blade has slots 205 and 206, which each receive one of the tension screws 207 and 208 respectively, coiled springs 209 and 210 upon the respective pins pressing against a plate 211, which bears against the face of the blade.

The guide sheave 194 is intermittently rotated by a ratchet wheel 213 which is fixed upon it, and the teeth of which are engaged by a pawl 214 pivoted upon a lever 215 pivoted at one end upon the axle 216 of the guide sheave. The opposite end of the lever is connected by a rod 217 with a bell crank lever 218 fulcrumed at 219, and pivotally connected at its other end 220 to a horizontal lever 221, the opposite end of which is pivoted at 222 upon the end of a projection 223, extending laterally from the side of the lever 180. To prevent over-running of the paper ribbon spool 191, a spring 266 adjusted by a thumb screw 267 has a brake shoe 268 which presses against a boss 269 projecting from the spool.

The carbon ribbon C is wound upon a spool 224, extends across the machine in a line with the paper ribbon and beneath the friction guide rollers 225 and 226, and is wound upon the spool 227. The carbon ribbon is intermittently wound from the spool 224 to spool 227 by a ratchet wheel 234 (Figs. 1 and 4) fixed upon the spindle 235 of the spool 227 and engaged by a pawl 230 pivoted to an arm 231 journaled at one end upon the spindle 235 and intermittently vibrated from the lever 215 to which it is connected by a rod 232 to an arm 233 projecting from the lever 215. In order to provide for the carbon ribbon being re-wound from the spool 227 to the spool 224, a ratchet wheel 228 (Figs. 1 and 3) fixed upon the spindle 229 of the spool 224 is engaged by a pawl 237 pivoted upon an arm 238 journaled at one end upon said spindle 229. The end of the arm is connected by a rod 239 with a bell crank lever 240 fulcrumed on the frame of the machine and connected at its end 241 with a horizontal lever 242 (corresponding to said lever 221) pivotally connected at its end 243 to an extension 244 from the arm 188 upon the rocking shaft 71.

The teeth of the ratchet wheels of the respective spools project in opposite directions and by turning one of the pawls upon its pivot out of engagement with the teeth of its ratchet wheel, the spool on that side is free to rotate while the winding is effected by the pawl in engagement with the teeth of the ratchet wheel of the other spool. To enable the characters typed on the paper ribbon to be seen while the writing proceeds, the carbon ribbon is located alongside the paper ribbon but is not superposed until the moment before a letter is struck.

The movement of the carbon ribbon and its spools is effected in the following way: A bar 245 extends across the machine and has journaled upon it said friction rollers 225 and 226. The spindles 229 and 235, of the carbon spools, pass through holes in the respective ends of the bar which bears against the ends of the spools, so that when said bar is shifted horizontally, the spools are pushed along their respective spindles.

To cause the spools to rotate with their respective spindles while they are also free to slide upon them, the following arrangement is employed: Upon the end of the spindle 229 is an arm 246 at the end of which is an eye through which slides a pin 247 projecting from the side of the spool. A similar arrangement is used in connection with the other spool, the spindle 235 having an arm 248 fixed upon it, which arm has an eye receiving the pin 249 projecting from the spool.

The bar 245 is shifted horizontally to superpose the paper ribbon in the following manner: One of its ends passes through a loop 250 at the end of an arm 251 pivotally connected to a lever 252 fulcrumed at 253 and pivoted at its lower end to the end of the horizontal lever 221. Similarly the opposite end of the bar passes through a loop 254 at the end of an arm 255 pivotally connected to a lever 256 fulcrumed at 257 and pivoted at its lower end to the end of the horizontal lever 242.

What I do claim and desire to secure by Letters Patent is:—

1. Apparatus for translating and recording dot and dash flash light signals, comprising a series of slide bars adapted to be independently moved in one direction or the other according as a dot or dash signal is received, a plurality of movable stop plates controlled by said slide-bars and a plurality of type levers controlled by said stop plates in accordance with the operation of the slide bars.

2. Apparatus for translating and recording dot and dash flash light signals, comprising a series of slide bars adapted to be independently moved in one direction or the other according as a dot or dash signal is received, a plurality of movable stop plates controlled by said slide-bars, each slide bar controlling two stop plates and releasing one of said plates when moved in either direction, and a plurality of type levers controlled by said stop plates in accordance with the operation of the slide bars.

3. Apparatus for translating and recording dot and dash flash light signals, comprising a series of slide bars adapted to be independently moved in one direction or the other according as a dot or dash signal is received, a plurality of movable stop plates controlled by said slide-bars, projections upon said stop plates in staggered relation, projections upon said slide bars each bearing upon the projections of two stop plates, so as to release one of said plates when moved in either direction, and a plurality of type levers controlled by said stop plates in accordance with the operation of the slide bars.

4. Apparatus for translating and recording dot and dash flash light signals, comprising a series of slide bars adapted to be independently moved in one direction or the other according as a dot or dash signal is received, a plurality of movable stop plates controlled by said slide bars, a plurality of type levers adjacent said stop plates, and recesses arranged in groups in said stop plates opposite said type levers, the stop plates normally preventing said levers entering said recesses, but certain of them being controlled by the operation of said slide bars according to the signals received to allow the corresponding type lever to enter a group of recesses in the plates.

5. Apparatus for translating and recording dot and dash flash light signals, comprising a series of slide bars adapted to be independently moved in one direction or the other according as a dot or dash signal is received, a plurality of movable stop plates controlled by said slide bars, a plurality of type levers adjacent said stop plates, spring-operated sliding heads carried by said type levers, and recesses arranged in groups in said stop plates opposite said sliding heads, the stop plates normally preventing said heads entering said recesses but certain of them being controlled by the operation of said slide bars according to the signals received to allow the corresponding type lever to enter a group of recesses in the plates.

6. Apparatus for translating and recording dot and dash flash light signals, comprising a series of slide bars adapted to be independently moved in one or the other direction according as a dot or dash signal is received, a plurality of spring operated stop plates controlled by said slide bars, a plurality of type levers arranged adjacent said stop plates, and recesses arranged in groups in said stop plates, said slide bars normally engaging said stop plates so that the latter prevent the type levers entering the recesses therein, the movement of the slide bars in accordance with the signals received, allowing certain of said stop plates to move under the action of their springs so as to allow the corresponding lever to enter the group of recesses in the remaining plates.

7. Apparatus for translating and recording dot and dash flash light signals, comprising a series of slide bars adapted to be independently moved in one direction or the other according as a dot or dash signal is received, a plurality of movable stop plates controlled by said slide bars, a plurality of type levers adjacent said stop plates, spring-operated sliding heads carried by said type levers, and recesses arranged in groups in said stop plates opposite said sliding heads, the stop plates normally preventing said heads entering said recesses but certain of them being controlled by the operation of said slide bars according to the signals received to allow the corresponding type levers to enter a group of recesses in the plates, said sliding heads when moved passing beneath a depression bar by the operation of which, the type lever is rocked to cause the letter to be printed.

8. Apparatus for translating and recording dot and dash flash light signals, comprising a series of slide bars adapted to be independently moved in one direction or the other according as a dot or dash signal is received, a plurality of movable stop plates controlled by said slide bars, a plurality of type levers adjacent said stop plates, and recesses arranged in groups in said stop plates opposite said type levers, a hand lever for moving said slide bars in either direction and means operated by said hand lever for allowing movement of certain of said stop plates, which are released by the slide bars, so as to allow the corresponding type lever to enter the group of recesses in the remaining plates.

9. Apparatus for translating and recording dot and dash flash light signals, comprising a series of slide bars adapted to be moved independently in one direction or the other according as a dot or dash signal is received, a plurality of movable stop plates controlled by said slide bars, a plurality of type levers adjacent said stop plates, and recesses arranged in groups in said stop plates opposite said type levers, a hand lever for moving said slide bars in either direction, a plurality of springs for moving said stop plates, a member engaging said stop plates to prevent movement thereof, a catch holding said member in engagement therewith and a lever operated by said hand lever for releasing said catch to allow the springs to move certain of the stop plates, which are released by the slide bars, so as to allow the corresponding type lever to enter the group of recesses in the remaining plates.

10. Apparatus for translating and recording dot and dash flash light signals, comprising a plurality of stop plates, recesses arranged in groups in said plates, type levers arranged opposite said groups of recesses, a hand-operated lever, means operated by said lever, for releasing certain of said stop plates according to the signals received and means operated by said lever for allowing movement of the released stop plates to allow the corresponding type lever to enter a group of recesses in the remaining stop plates.

11. Apparatus for translating and recording dot and dash flash light signals, comprising a plurality of stop plates, recesses arranged in groups in said plates, type levers arranged opposite said groups of recesses, a hand-operated lever adapted to be moved in either of two opposite directions, means operated by either movement of said lever for releasing certain of said stop plates according to the signals received, said lever being movable in a third direction at right angles to its other movements and means operated by the third movement of said lever for allowing movement of the released stop plates to allow the corresponding type lever to enter a group of recesses in the remaining stop plates.

12. Apparatus for translating and recording dot and dash flash light signals, comprising a plurality of stop plates, recesses arranged in groups in said plates, type levers arranged opposite said groups of recesses, a hand-operated lever, comprising two parts, one part movable independently in either of two opposite directions for releasing certain of said stop plates according to the signals received, and both parts being movable in a third direction at right angles to the other movements of the lever, means being operated by the third movement of said lever for allowing movement of the released stop plates to allow the corresponding type lever to enter a group of recesses in the remaining stop plates.

13. Apparatus for translating and recording dot and dash flash light signals, comprising a plurality of stop plates, recesses arranged in groups in said plates, type levers arranged opposite said groups of recesses, a plurality of slide bars, adapted to be moved to release certain of said stop plates in accordance with the signals received, a hand lever, means operated by said lever for moving one or more of said slide bars in succession, and means operated by said lever for allowing movement of the released stop plates, to allow the corresponding type lever to enter a group of recesses in the remaining stop plates.

14. Apparatus for translating and recording dot and dash flash light signals, comprising a plurality of stop plates, recesses arranged in groups in said plates, type levers arranged opposite said groups of recesses, a plurality of slide bars adapted to be moved to release certain of said stop plates in accordance with the signals received, a hand lever, a second lever operated by said hand lever, a spindle adapted to be rocked by the second lever, an arm carried by said spindle adapted when the latter is rocked to engage and move said slide bars in succession and means operated by said lever for allowing movement of the released stop plates to allow the corresponding type lever to enter a group of recesses in the remaining stop plates.

15. Apparatus for translating and recording dot and dash flash light signals, comprising a plurality of stop plates, recesses arranged in groups in said plates, type levers arranged opposite said groups of recesses, a plurality of slide bars adapted to be moved to release certain of said stop plates in accordance with the signals received, a hand lever, a second lever operated by said hand lever, a spindle adapted to be rocked by said second lever, an arm slidably secured to said spindle and adapted when the latter is rocked to engage and move said slide bars in succession, a rack bar connected to said arm, a pawl engaging said rack bar, means operated by the return movement of the hand lever to operate said pawl and move the rack and arm opposite a succeeding slide bar, and means operated by said hand lever for allowing movement of the released stop plates to allow the corresponding type lever to enter a group of recesses in the remaining stop plates.

16. Apparatus for translating and recording dot and dash flash light signals, comprising a plurality of stop plates, recesses arranged in groups in said plates, type levers arranged opposite said groups of recesses, a plurality of slide bars adapted to be moved to release certain of said plates in accordance with the signals received, a hand lever, means operated by said lever for moving one or more of said slide bars in succession, means operated by said lever for allowing movement of the released stop plates to allow the corresponding type lever to enter a group of recesses in the remaining stop plates, means for locking said slide bars when moved, and means operated by said hand lever for releasing said locking means.

17. Apparatus for translating and recording dot and dash flash light signals, comprising a plurality of stop plates, recesses arranged in groups in said plates, type levers arranged opposite said groups of recesses, a plurality of slide bars adapted to be moved to release certain of said stop plates in accordance with the signals received, a hand lever, a second lever operated by said hand lever, a spindle adapted to be rocked by the second lever, an arm pivoted on a member carried by said spindle, lugs on said slide bars, lugs on said arm adapted when the spindle is rocked to engage and move said slide bars in succession, and means operated by said lever for allowing movement of the released stop plates to allow the corresponding type lever to enter a group of recesses in the remaining stop plates.

18. Apparatus for translating and recording dot and dash flash light signals, comprising a plurality of stop plates, recesses arranged in groups in said plates, type levers arranged opposite said groups of recesses, a plurality of slide bars, adapted to be moved to release certain of said stop plates in accordance with the signals received, a hand lever, a second lever operated by said hand lever, a spindle carried by said second lever, a crank on said spindle, a stationary fork member, a pin on said crank engaging said fork for rocking the spindle when the lever is operated, an arm carried by said spindle, adapted when the latter is rocked to engage and move said slide bars in succession, and means operated by said lever for allowing movement of the released stop plates, to allow the corresponding type lever to enter a group of recesses in the remaining stop plates.

19. Apparatus for translating and recording dot and dash flash light signals, comprising a plurality of stop plates, recesses arranged in groups in said plates, type levers arranged opposite said groups of recesses, a plurality of slide bars adapted to be moved to release certain of said stop plates in accordance with the signals received, a hand lever, means operated by said lever for moving one or more of said slide bars in succession, a member engaging said stop plates, a catch holding said member in engagement with said plates, and a lever rocked by said hand lever for moving said catch to disengage said member and allow movement of the released stop plates to allow the corresponding type lever to enter a group of recesses in the remaining stop plates.

20. Apparatus for translating and recording dot and dash flash light signals, comprising a plurality of stop plates arranged one above the other, vertical groups of recesses arranged in said stop plates, type levers adjacent said stop plates, spring-operated sliding heads on said type levers, a plurality of slide bars, each bar engaging two of said stop plates, a hand lever adapted to engage each of said slide bars in succession and move the same to the right or left according as a dot or dash signal is received, so as to release one of said stop plates, and means operated by said hand lever for allowing movement of the released stop plates to allow the sliding head on the corresponding type lever to enter a group of recesses in the remaining stop plates.

21. Apparatus for translating and recording dot and dash flash light signals, comprising a plurality of stop plates arranged one above the other, vertical groups of recesses arranged in said stop plates, springs for moving said stop plates in one direction, type levers adjacent said stop plates, spring-operated sliding heads on said type levers, a plurality of slide bars each bar engaging two of said stop plates, a hand lever adapted to engage each of said slide bars in succession and move the same to the right or left according as a dot or dash signal is received, so as to release one of said stop plates, springs for returning said slide bars to their normal position, means operated by said hand lever for allowing movement of the released stop plates under the action of their springs, so as to allow the sliding head on the corresponding type lever to enter a group of recesses in the remaining stop plates, means for locking said slide bars when moved, and means operated by said hand lever for releasing said locking means and allowing the slide bars to be returned to normal position by their springs.

In testimony whereof, I have signed my name to this specification in the presence of two subscribing witnesses.

THOMAS MELVILLE.

Witnesses:
  I. I. WATSON,
  OTHO W. WILTON.